Oct. 11, 1966 K. G. KREUTER 3,278,702
PNEUMATIC TEMPERATURE CONTROL WITH HEATING MEANS
AND BIMETALLIC FLAPPER VALVE
Filed Dec. 29, 1964

INVENTOR
KENNETH G. KREUTER

BY Anthony A. O'Brien
ATTORNEY

United States Patent Office 3,278,702
Patented Oct. 11, 1966

3,278,702
PNEUMATIC TEMPERATURE CONTROL WITH HEATING MEANS AND BIMETALLIC FLAPPER VALVE
Kenneth G. Kreuter, Goshen, Ind., assignor to Robertshaw Controls Company, Richmond, Va., a corporation of Delaware
Filed Dec. 29, 1964, Ser. No. 421,920
10 Claims. (Cl. 200—81)

The present invention relates to a pneumatic control in a condition controlling system and, more particularly, to a pneumatic time proportioning control for temperature control in heating and/or cooling systems.

An object of this invention is to proportion the on-time of a condition controlling system in response to a proportional pneumatic signal from the condition control device in such system.

Another object of this invention is to decrease the cycle period of a heated bimetal controlling a leakport in response to increases in pneumatic signals from the condition control device in a condition controlling system.

It is another object of this invention to position ambient heating means adjacent the bimetal controlling leakport in a pneumatic proportioning control.

This invention has another object in that the cycling movement of a bimetal controlling the bleed from the main pressure chamber of a pneumatic proportioning control is affected by heating means which is controlled by such main pressure chmaber.

This invention has a further object in the percentage on-time of a condition controlling system is varied inversely in a linear relationship with the amplitude of the input signal of a pneumatic proportioning control.

In its preferred embodiment, the present invention is characterized in that a relay is utilized to energize and deenergize a condition controlling system, electric circuit means actuates the relay, means defining a main pneumatic chamber connected to main pneumatic pressure means is movable to actuate the electric circuit means between open and closed circuit positions in response to main pneumatic pressures, a leakport exhausts the main pneumatic chamber and is controlled by bimetal flapper means, means defining a branch pneumatic chamber connected to branch pneumatic pressure means is movable to position the bimetal flapper means relative to the leakport in response to branch pneumatic pressures, and a heating coiling in the electric circuit means is disposed in proximity to the bimetal flapper means whereby cycling thereof is varied in accordance with variations in branch pressure.

Other objects and advantages of the present invention will become apparent from the following description taken in connection with the accompanying drawing wherein.

Figure 1:
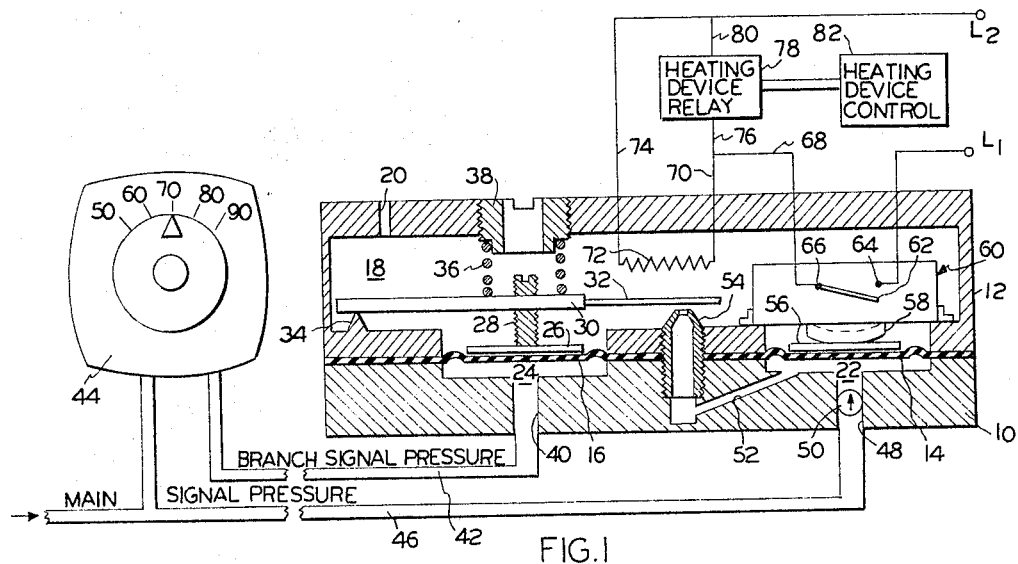
FIG. 1 is a schematic diagram with parts in sections of a preferred embodiment of the present invention.

With reference to the drawing, a preferred embodiment of the invention includes a casing having a base portion 10 and a cover portion 12 securely fastened together as by screws (not shown). A pair of flexible diaphragms 14 and 16 are mounted in the casing with their peripheries clamped between cooperating sections of the base and cover portions. In this arrangement, the upper surfaces of the diaphragms 14 and 16 and the cover 12 define an atmospheric pressure chamber 18 communicating with the atmosphere through a port 20; the base 10 and the lower surfaces of the diaphragms 14 and 16 define a main air pressure chamber 22 and a branch air pressure chamber 24, respectively.

The upper surface of diaphragm 16 is engaged by a diaphragm plate 26 having a threaded stem 28 thereon. The stem 28 is adjustably threaded through an intermediate portion of a set point lever 30, one end of which carries an ambient compensated bimetal flapper 32 while an opposite end portion is fulcrumed on a pivot 34 carried by a casing section. A coil spring 36 surrounds the upper end portion of adjusting stem 28 and is mounted in compression between the upper surface of lever 30 and the notched surface of a hollow set screw 38 which is adjustably threaded through the cover 12. The coil spring 36 biases the set pivot lever 30 in a clockwise direction on the pivot 34 and such bias may be adjusted by the set screw 38. The biasing force is opposed by the pressure force from the diaphragm 16 which urges the plate 26, adjusting stem 28 and lever 30 in a counterclockwise direction around the pivot 34; the set point of the lever 28 may be adjusted by inserting a suitable tool through the hollow set screw 38 for rotating the adjusting stem 28.

The chamber 24 communicates with a port 40 in the base 10, which port is connected to a branch signal pressure conduit 42. The other end of conduit 42 is connected to a pneumatic control device that may be a thermostat, humidistat or controller but for the purposes of describing the present invention is illustrated as a pneumatic thermostat 44. Since pneumatic thermostats are well known in the art, the specific details are excluded for the sake of brevity; it is only required that the pneumatic thermostat 44 receive air pressure from the main signal pressure conduit 46 and deliver a branch signal to the conduit 42. As is well known, such a pneumatic thermostat includes a temperature setting mechanism and dial whereby the delivered branch signal varies in pressure according to the temperature variation from the set temperature.

The chamber 22 communicates with a port 48 in the base 10, which port is connected to the main signal pressure branch 46. A one-way check valve 50 in the port 48 prevents back flow from the chamber 22 to the conduit 46. A bleed passage 52 in base 10 bleeds pressure from the chamber 22 into a nozzle fitting 54 which is fastened in the casing as by threads through adjacent sections of the base 10 and cover 12. The nozzle fitting 54 defines a leakport opening into the atmospheric chamber 18; the bimetal flapper 32 controls the flow out of the leakport 54 whereby the pressure in the chamber 22 varies in accordance with the rate of bleed through the leakport 54.

The upper surface of diaphragm 14 is engaged by a diaphragm plate 56 which in turn is engaged by the operating button 58 of a snap acting switch, indicated generally at 60, that is secured to a section of cover 12 by any suitable means (not shown). The operating structure of the switch 60 is not illustrated inasmuch as any conventional snap acting switch may be used; it is understood that the operating button causes a snap mechanism to move a switch arm 62 between open circuit and closed circuit positions.

One terminal contact 64 of the switch 60 is connected to lead line $L_1$ and the other terminal contact 66 is connected to a conductor 68. One branch circuit from conductor 68 includes a conductor 70 connected to heating means in the form of a resistance heater coil 72 that is connected to a conductor 74 leading to the lead line $L_2$. The other branch circuit from conductor 68 includes a conductor 76 connected to an electrical relay 78 that is connected to a conductor 80 leading to the lead line $L_2$.

The characteristics of the graphs shown in FIGS. 2 and 3 will be described in appropriate relationship with the following description of the sequence of operation of the control illustrated in FIG. 1. In addition, while the electric relay 78 may be utilized to actuate a variety of terminal controls, such as a cooling control for an air conditioning system, for the purposes of the present description, the relay 78 is being designated as a relay for the terminal control of a heating device 82 in heating system.

In a typical application where the pneumatic thermostat 44 is being utilized to control electric heat, the pneumatic time proportioning control is connected to the branch and main conduits 42 and 46 as shown in FIG. 1. A demand for heat is sensed by the pneumatic thermostat 44 causing a decrease in the branch signal pressure; the resulting pressure decreases in the branch signal chamber 24 causes downward movement of the branch signal diaphragm 16 together with plate 26, stem 28 and set point lever 30. The bimetal flapper 32 on the lever 30 is thus moved in response to decreasing branch pressure to close the leakport nozzle 54. The closure of the leakport nozzle 54 stops the bleed from the main signal pressure chamber 22 whereby the pressure therein is increased by upward movement of the main air interlock diaphragm 14 to actuate the switch 60 to a circuit closing position.

Closure of the switch 60 accomplishes two functions: one function being the energization of the relay 78 whereby the heating device is actuated to supply heat to the space being controlled by the thermostat 44, and the other function being the energization of the resistance heater 72. As the flow of current increases the temperature of the resistance heater 72, which is disposed in heating proximity to the bimetal 32, the temperature increase is sensed by the bimetal 32 that warps proportionately with the intensity of the heat. As the bimetal 32 warps upwardly, the leakport nozzle 45 is opened permitting the main air to exhaust from the main air interlock chamber 22. When the pressure in chamber 22 decreases sufficiently, the diaphragm 14 and switch arm 62 are returned to their positions as shown in FIG. 1; thus the switch 60 is moved to its open circuit position and the circuits for the resistance heater 72 and the relay 78 are broken and the heating device cuts off the supply of heat. As the resistance heater 72 and the bimetal 32 cool, the bimetal 32 is moved to close the leakport nozzle 54 whereby the cycle is started over again.

The time of the cycles is a function of the distance between the heater coil 72 and the bimetal 32. As the branch signal pressure increases, the bimetal 32 is forced closer and closer to the heater coil 72 so that the heat therefrom is sensed faster and more intensely by the bimetal 32 causing a decrease in the cycle period.

In the above arrangement, the bimetal 32 is normally biased onto the leakport nozzle 54 which is thus closed; accordingly, the relay 78 and the heater coil 72 are energized. When the branch signal pressure in the chamber 24 is below 4 p.s.i., there is insufficient heat developed by the heater coil 72 to open the leakport nozzle 54. With branch signal pressures between 4 and 8 p.s.i., the heater coil 72 causes the bimetal 32 to open the leakport nozzle 54 whereby the heater coil 72 and the electric relay 78 are deenergized; thus a self-cycling arrangement is set up with the percent on-time being determined by the signal pressure. For certain installations, the pneumatic time proportioning control may be adjusted to operate between 8 and 12 p.s.i. branch signal pressures by increasing the bias of the coil spring 36.

Figure 2:
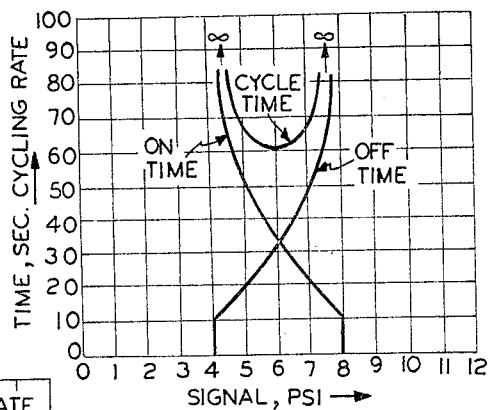
FIG. 2 is a graph of the cycling rate versus the branch signal pressure.

As is illustrated in FIG. 2, the cycling rate of the pneumatic time proportioning control is plotted on a graph with the cycling rate in seconds versus the branch signal pressure in p.s.i. From the on-time and off-time curves of FIG. 2, it is apparent that with 10 second minimum on and off times, the cycling bimetal produces 30 seconds on-time and 30 seconds off-time at the mid signal pressure of 6 p.s.i. Similar curves would also result when the spring adjustment is altered to the 8–12 p.s.i. signal range.

Figure 3:
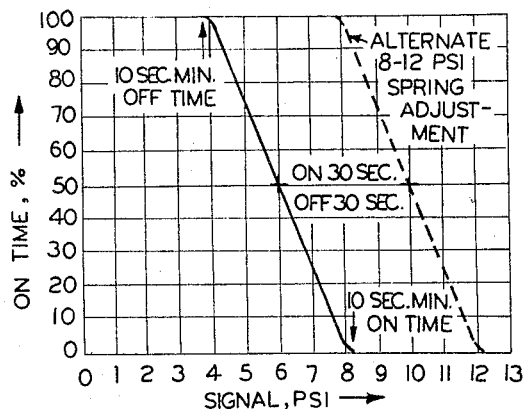
FIG. 3 is a graph of the percent on-time versus the branch signal pressure.

In FIG. 3, the percent on-time is plotted against the branch signal pressure in p.s.i. to show that as the proportional signal increases in amplitude, the cyclical on-time of the heating device control 82 will increase from zero to one hundred percent of the cycle. Thus, the percentage on-time varies inversely in a linear relationship with the amplitude of the proportional signal. From the graph of FIG. 2, the present device is designed to produce 30 second on and off times at mid signal pressure of 6 p.s.i. with 10 second minimum on and off times. Thus, in order to produce 10% of its capacity, the heating device will be on approximately 11 seconds and be off 99 seconds; to produce 50% of capacity, it will be on 30 seconds and off 30 seconds; and, to produce 95% of capacity, it will be on 190 seconds and off 10 seconds.

With the above arrangement, the pneumatic time proportioning control automatically controls the heating device whereby the on-time thereof is in proportion to the heat demand of the pneumatic thermostat. As the temperature increases in the space controlled by the pneumatic thermostat, the branch signal pressure increases so that the amount of on-time decreases proportionately.

Inasmuch as the preferred embodiment of the present invention is subject to many variations, modifications and changes in details, it is intended that all matter contained in the foregoing description or shown on the accompanying drawing shall be interpreted as illustrative and not in a limiting sense.

What is claimed is:

1. In a condition control system, the combination comprising,
    relay means adapted to actuate a control device,
    electric circuit means for energizing said relay means,
    means defining a main pneumatic chamber connected to main pneumatic pressure means and being mechanically coupled to said electric circuit means to actuate said electric circuit means between open and closed circuit positions in response to main pneumatic pressures,
    a leakport communicating with said main pneumatic chamber for exhausting the same,
    bimetal flapper means controlling said leakport,
    means defining a branch pneumatic chamber connected to branch pneumatic pressure means and being connected to said bimetal flapper means to position said bimetal flapper means relative to said leakport in response to branch pneumatic pressures, and
    heating means for said bimetal flapper means and being operatively connected to said electric circuit means whereby cycling of said bimetal flapper means is varied in accordance with variations in branch pneumatic pressures.

2. The combination as recited in claim 1 wherein said bimetal flapper means includes a bimetal flapper and lever means for mounting the same, said lever means being operatively connected to said means defining the branch pneumatic chamber.

3. The combination as recited in claim 2 wherein said heating means comprises a resistance heater disposed in heating proximity to said bimetal flapper.

4. Pneumatic control apparatus for a condition control system comprising
    a casing having a pair of pneumatic pressure chamber means,
    control means connected to one of said chamber means and being movable between on and off positions in response to a predetermined pressure therein,
    a pneumatic source communicating with said one chamber means for pressurizing the same,
    a leakport communicating with said one chamber means for depressurizing the same,
    bimetal flapper means movable relative to said leakport for controlling the same,
    condition responsive means having a supply port communicating with said pneumatic source and a branch port communicating with the other of said chamber means for transmitting a branch signal pressure thereto, lever means connected to said other chamber means for movement in response to variations of the branch signal pressure therein and being connected to said bimetal flapper means whereby exhaust of said one chamber means through said leakport varies in accordance with variations of the branch signal pressure in said other chamber means, and heating means for heating said bimetal flapper means and being connected to said control means for energization thereby whereby said control means is disposed in its on position for a time in proportion to the variations of the branch signal pressure.

5. The combination as recited in claim 4 wherein said heating means comprises a resistance heater disposed in proximity to said bimetal flapper means.

6. The combination as recited in claim 5 wherein said one chamber means includes a diaphragm actuator and said control means comprises electric circuit means including an electric switch operatively connected to said diaphragm actuator and a relay operated device for varying the condition being controlled, said resistance heater being connected to said electric switch for energization thereby.

7. A pneumatic time proportioning control comprising a casing having a main chamber, a branch chamber and a supply port for each chamber, a diaphragm defining a movable wall for each chamber and being movable in response to pressure variations therein, a pneumatic source communicating with the main chamber supply port for pressurizing said main chamber, a leakport communicating with said main chamber for depressurizing the same, a bimetal flapper movably mounted adjacent said leakport whereby pressurized and depressurized conditions of said main chamber are controlled in accordance with movement of said bimetal flapper, condition responsive means having an inlet port communicating with said pneumatic source and an outlet port communicating with the branch chamber supply port for pressurizing said branch chamber with a branch signal pressure, lever means operatively connected to the branch chamber diaphragm for movement thereby and being connected to said bimetal flapper for moving the same in response to branch signal pressure variations, an electric switch operatively connected to the main chamber diaphragm for movement between closed and open circuit positions corresponding to the pressurized and depressurized conditions of said main chamber, relay control means controlled by said electric switch, and heating means connected to said switch and heating said bimetal flapper, said switch energizing said heating means and said relay control means when in a closed circuit position whereby the time of energization is in proportion to the branch signal pressure variations.

8. The combination as recited in claim 7 wherein lever means comprises a lever being pivotally mounted adjacent one end and carrying said bimetal flapper on its other end, an intermediate portion of said lever being disposed for operative connection to the branch chamber diaphragm, and biasing means for biasing said lever toward the branch chamber diaphragm.

9. The combination as recited in claim 8 wherein said biasing means comprises a coil spring engaging the intermediate portion of said lever, and adjustment means for selectively varying the bias of said coil spring.

10. The combination as recited in claim 9 wherein said heating means comprises a resistance heater and wherein said resistance heater and said relay control means are simultaneously energized.

References Cited by the Examiner
UNITED STATES PATENTS

| 2,651,468 | 9/1953 | Joestings | 236—44 |
| 3,069,088 | 12/1962 | Scharpf. | |

FOREIGN PATENTS 608,277  11/1960  Canada.

BERNARD A. GILHEANY, *Primary Examiner*,

H. M. FLECK, *Assistant Examiner*.